United States Patent
Chen

(10) Patent No.: US 9,491,039 B2
(45) Date of Patent: *Nov. 8, 2016

(54) METHOD AND APPARATUS FOR DIAGNOSING FAULTS IN A HYBRID INTERNET PROTOCOL NETWORK

(71) Applicant: AT&T Intellectual Property I, LP, Atlanta, GA (US)

(72) Inventor: Weijing Chen, Leander, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,268

(22) Filed: Sep. 24, 2015

(65) Prior Publication Data

US 2016/0013967 A1    Jan. 14, 2016

Related U.S. Application Data

(63) Continuation of application No. 14/208,765, filed on Mar. 13, 2014, now Pat. No. 9,172,652, which is a continuation of application No. 13/625,955, filed on Sep. 25, 2012, now Pat. No. 8,711,700, which is a (Continued)

(51) Int. Cl.
*H04L 12/28* (2006.01)
*H04L 12/24* (2006.01)
(Continued)

(52) U.S. Cl.
CPC ............... *H04L 41/02* (2013.01); *H04L 12/18* (2013.01); *H04L 12/2602* (2013.01);
(Continued)

(58) Field of Classification Search
CPC ............... H04L 12/56; H04L 2012/56; H04L 2012/5667; H04L 49/606; H04L 12/66; H04L 2012/46; H04L 2012/5618; H04L 12/46; H04L 45/02; H04L 45/04; H04L 45/10; H04L 12/4625; H04L 12/04; H04L 41/02; H04L 12/2602; H04L 43/00; H04L 47/10; H04L 43/12; H04L 47/32; H04L 12/18; H04L 41/0677; H04L 43/0823; H04L 43/10; H04L 43/18; H04L 41/08; H04L 43/08
USPC ........... 370/389, 395.52, 401, 400, 402, 466
See application file for complete search history.

(56) References Cited

U.S. PATENT DOCUMENTS 5,519,704 A    5/1996    Farinacci et al.
5,818,838 A    10/1998    Backes et al.
(Continued)

FOREIGN PATENT DOCUMENTS

JP    2004/364065    12/2004

*Primary Examiner* — Brenda H Pham
(74) *Attorney, Agent, or Firm* — Guntin & Gust, PLC; Jay H. Anderson

(57) ABSTRACT

An Ethernet switch can receive an internet protocol query packet generated by a receiver for collecting telemetry data between a source and the receiver in a multicast network, translate the internet protocol query packet to an Ethernet query packet, collect in the Ethernet query packet telemetry data from the Ethernet switch where at least one telemetry field of the Ethernet Switch includes an arrival time of the Ethernet query packet at the Ethernet switch, and submit the Ethernet query packet to the next network element of the multicast network. An internet protocol router can receive an Ethernet query packet generated by an Ethernet switch having at least one field for telemetry for collecting telemetry data between a source and a receiver, translate the Ethernet query packet to an internet protocol query packet, and submit the internet protocol query packet to the next network element. Additional embodiments are disclosed.

20 Claims, 4 Drawing Sheets

Related U.S. Application Data continuation of application No. 12/701,020, filed on Feb. 5, 2010, now Pat. No. 8,300,537, which is a continuation of application No. 11/191,758, filed on Jul. 28, 2005, now Pat. No. 7,684,335.

(51) Int. Cl.

| | | |
|---|---|---|
| *H04L 12/26* | (2006.01) | |
| *H04L 12/801* | (2013.01) | |
| *H04L 12/823* | (2013.01) | |
| *H04L 12/18* | (2006.01) | |
| *H04L 12/54* | (2013.01) | |

(52) U.S. Cl.
CPC .......... *H04L 41/0677* (2013.01); *H04L 43/00* (2013.01); *H04L 43/0823* (2013.01); *H04L 43/10* (2013.01); *H04L 43/12* (2013.01); *H04L 43/18* (2013.01); *H04L 47/10* (2013.01); *H04L 47/32* (2013.01); *H04L 12/56* (2013.01); *H04L 41/06* (2013.01); *H04L 43/08* (2013.01); *H04L 43/0852* (2013.01); *H04L 43/0882* (2013.01)

(56) References Cited

U.S. PATENT DOCUMENTS

| | | | |
|---|---|---|---|
| 6,480,508 B1* | 11/2002 | Mwikalo | H04L 29/12066 370/475 |
| 6,693,909 B1 | 2/2004 | Mo et al. | |
| 6,785,274 B2* | 8/2004 | Mahajan | H04L 12/4641 370/390 |
| 6,795,855 B2 | 9/2004 | Bonilla et al. | |
| 6,795,858 B1* | 9/2004 | Jain | H04L 67/1008 709/226 |
| 7,043,578 B2* | 5/2006 | Hufferd | H04L 1/0045 710/105 |
| 7,684,335 B2* | 3/2010 | Chen | H04L 43/18 370/236 |
| 7,853,720 B2* | 12/2010 | Choi | H04L 29/12066 709/223 |
| 8,300,537 B2* | 10/2012 | Chen | H04L 43/18 370/236.1 |
| 8,711,700 B2* | 4/2014 | Chen | H04L 43/18 370/236 |
| 9,172,652 B2* | 10/2015 | Chen | H04L 43/18 |
| 2002/0170004 A1 | 11/2002 | Parett et al. | |
| 2003/0182269 A1* | 9/2003 | Cheshire | H04L 61/1552 |
| 2003/0200335 A1 | 10/2003 | Choi et al. | |

\* cited by examiner

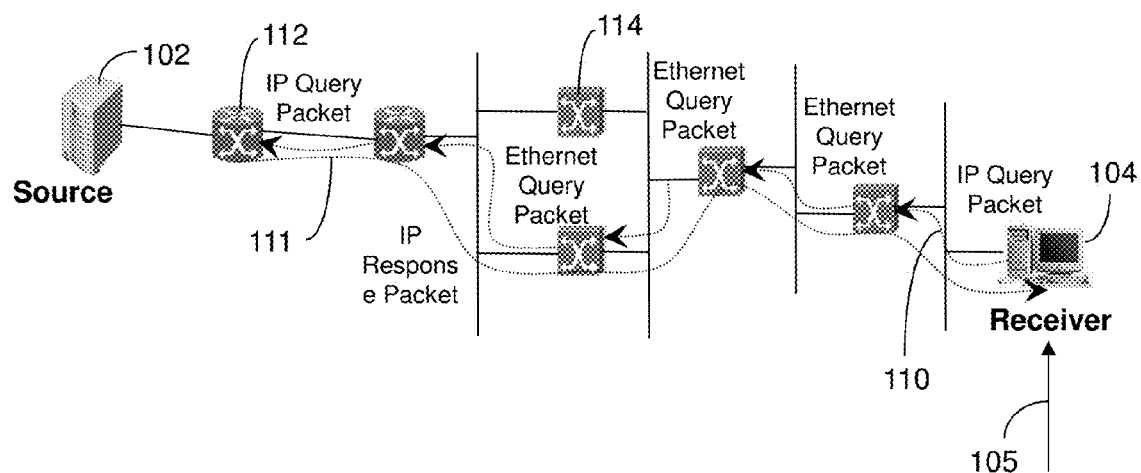
FIG. 1  100
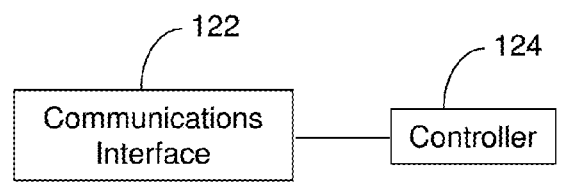
FIG. 2  112, 114

METHOD AND APPARATUS FOR DIAGNOSING FAULTS IN A HYBRID INTERNET PROTOCOL NETWORK

CROSS REFERENCE TO RELATED APPLICATIONS

This application is a continuation of U.S. patent application Ser. No. 14/208,765, filed Mar. 13, 2014, which is a continuation of U.S. patent application Ser. No. 13/625,955, filed Sep. 25, 2012 (now U.S. Pat. No. 8,711,700), which is a continuation of U.S. patent application Ser. No. 12/701,020, filed Feb. 5, 2010 (now U.S. Pat. No. 8,300,537), which is a continuation of U.S. patent application Ser. No. 11/191,758, filed Jul. 28, 2005 (now U.S. Pat. No. 7,684,335), the disclosures of all of which are incorporated herein by reference in their entirety.

FIELD

This disclosure relates generally to IP (Internet Protocol) diagnostic systems, and more particularly to a method and apparatus for diagnosing faults in a hybrid IP network.

BACKGROUND

As hybrid packet networks continue to evolve, the need for diagnosing troubled connections becomes increasingly important to the service provider of such networks. Hybrid IP (Internet Protocol) networks can include, for example, conventional IP routers and Ethernet switches for interconnecting parties. It is very common for these networks to support multicast communications (e.g., streaming video) between a source and many receivers such as computer terminals. When a user of a receiver experiences a communication interruption, it is common practice for the user to call the service provider and seek technical assistance.

Typically, service providers employ conventional diagnostic tools operating at the receiver of the end user to diagnose faults in the multicast connection. Tools such as "Mtrace" can be used to trace the multicast route from the receiver to the source. Consequently, the service provider can quickly diagnose, for example, a faulty router or links and thereby take evasive action to restore service to the end user. In hybrid networks, however, Ethernet switches serve as a pass-through devices in which IP mtrace packets are relayed between switches without inclusion of telemetry data from the switches. Consequently, if the communication issue arises from a fault at an Ethernet switch or sequence of switches, the service provider has no means of detecting the fault with a conventional Mtrace diagnostic test.

A need therefore arises for a method and apparatus for diagnosing faults in a hybrid IP network.

SUMMARY

Embodiments in accordance with the examples herein provide a method and apparatus for diagnosing faults in a hybrid IP network.

In a first embodiment, an IP router and an Ethernet switch, respectively, has a computer-readable storage medium for conducting diagnostics in a multicast network having network elements comprising one or more IP (Internet Protocol) routers and Ethernet switches. The storage medium of an Ethernet switch has computer instructions for receiving an IP query packet generated by a receiver for collecting telemetry data between a source and the receiver, translating an IP query packet to an Ethernet query packet, collecting in the Ethernet query packet telemetry data from the Ethernet switch, and submitting the Ethernet query packet to the next network element of the multicast network. The storage medium of an IP router has computer instructions for receiving the Ethernet query packet, translating the Ethernet query packet to an IP query packet, collecting in the IP query packet telemetry data from the IP router, and submitting the IP query packet to the next network element of the multicast network.

In a second embodiment, an IP router and an Ethernet switch, respectively, operate according to a method for conducting diagnostics in a multicast network having network elements comprising one or more IP (Internet Protocol) routers and Ethernet switches. At an Ethernet switch, the method comprises the steps of receiving an IP query packet generated by a receiver for collecting telemetry data between a source and the receiver, translating an IP query packet to an Ethernet query packet, collecting in the Ethernet query packet telemetry data from the Ethernet switch, and submitting the Ethernet query packet to the next network element of the multicast network. At an IP router, the method comprises the steps of receiving the Ethernet query packet, translating the Ethernet query packet to an IP query packet, collecting in the IP query packet telemetry data from the IP router, and submitting the IP query packet to the next network element of the multicast network.

In a third embodiment, an Ethernet switch has a communications interface, and a controller. The controller is programmed to receive an IP query packet generated by a receiver for collecting telemetry data between a source and the receiver in a multicast network, translate the IP query packet to an Ethernet query packet, collect in the Ethernet query packet telemetry data from the Ethernet switch, and submit the Ethernet query packet to the next network element of the multicast network.

In a fourth embodiment, an IP router has a communications interface, and a controller. The controller is programmed to receive an Ethernet query packet generated by an Ethernet switch for collecting telemetry data between a source and a receiver in a multicast network, translate the Ethernet query packet to an IP query packet, collect in the IP query packet telemetry data from the IP router, and submit the IP query packet to the next network element of the multicast network.

BRIEF DESCRIPTION OF THE DRAWINGS

FIG. 1 is block diagram of a hybrid network of Ethernet switches and IP routers according to an embodiment of the present disclosure;

FIG. 2 is block diagram of the IP router and the Ethernet switch, respectively, according to an embodiment of the present disclosure;

DETAILED DESCRIPTION

Figure 3:
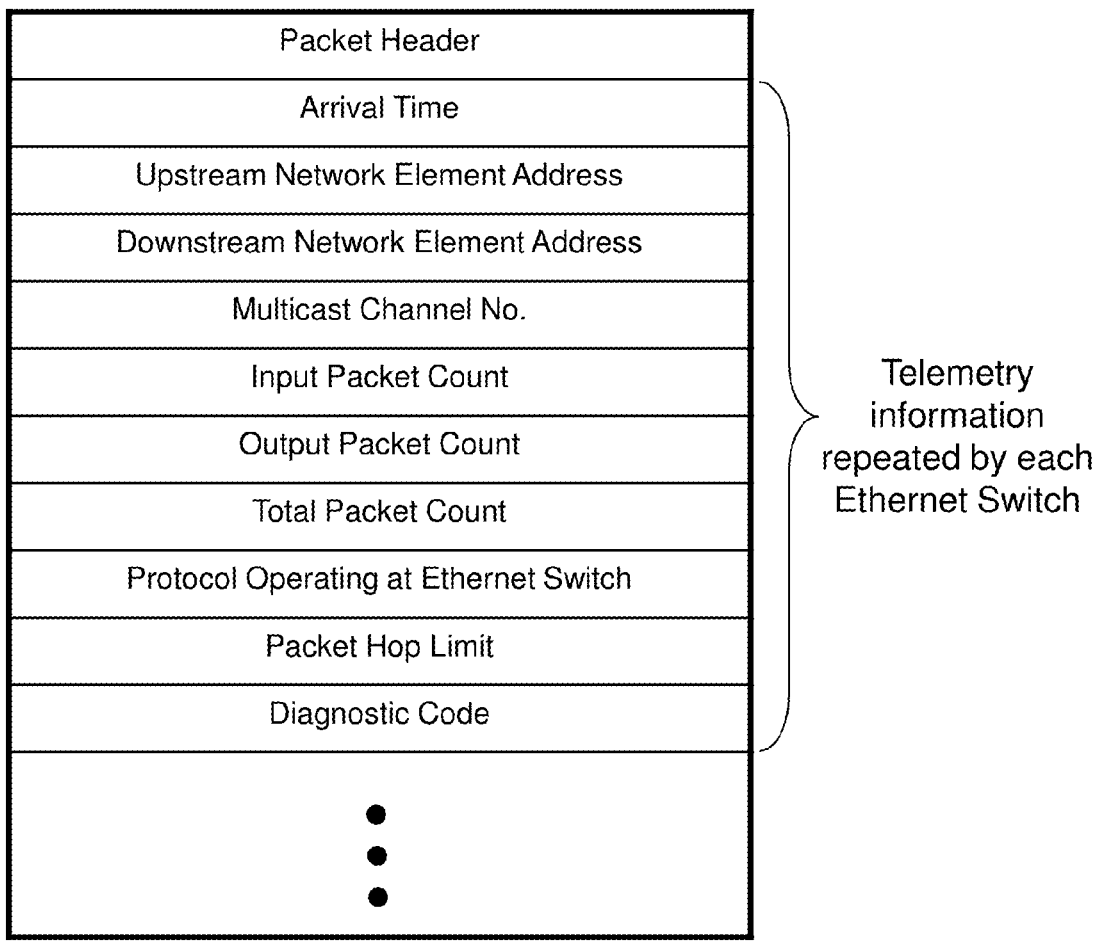
FIG. 3 is block diagram depicting a format of an Ethernet query packet according to an embodiment of the present disclosure.

While the specification concludes with claims defining the features of the embodiments that are regarded as novel, it is believed that the embodiments will be better understood from a consideration of the following description in conjunction with the figures, in which like reference numerals are carried forward.

FIG. 1 is block diagram of a hybrid network 100 of Ethernet switches 114 and IP routers 112 according to an embodiment. The present illustration represents a multicast network created between a source 102 (e.g., a server supplying streaming video) and a receiver 104 (e.g., a computer terminal of an end user). A multicast network in the present context extends the broadcast concept of one to many by allowing the sending of one transmission to many users in a defined group, but not necessarily to all users in that group.

Large service providers typically encounter a mix of network elements such as shown in FIG. 1. The Ethernet switches 114 can, for example, represent IGMP (Internet Group Management Protocol) snooping Ethernet switches. These switches can reside in a customers network, or can be supplied by the service provider. The IP routers 112 are conventional Internet Protocol routers available from many vendors such as, for example, Cisco™ Corporation.

FIG. 2 is basic block diagram of an IP router 112 and Ethernet switch 114, respectively, according to an embodiment of the present disclosure. Each device includes a communications interface 122 and a controller 124. In the case of an IP router 112, the communications interface 122 includes conventional technology that serves to interconnect the IP router 112 with other IP network elements of the hybrid network shown in FIG. 1. The interface 122 is bidirectional in that IP packets can either be generated or received at the interface and redirect to other network elements according to the routing tables established at the IP router 112. The controller 124 utilizes conventional computing technology such as one or more microprocessors, DSPs (Digital Signal Processors) and associated media storage (e.g., RAM, SRAM, DRAM, Flash, or disk media) for controlling operations of the IP router 112 in accordance with the present disclosure.

Like the IP router 112, the Ethernet switch 114 can include a communications interface 122 and a controller 124. These components, however, are tailored for Ethernet traffic as defined by such standards as IEEE 802.3. The communications interface 122 in this instance supports CSMA/CD (Carrier Sense Multiple Access Collision Detection) access method to handle simultaneous demands. This interface is one of the most widely implemented LAN standards. A newer version of Ethernet, called 100Base-T (or Fast Ethernet) supports data transfer rates of 100 Mbps. The present disclosure, however, can be applied to any Ethernet switch 114 technology including 1 G and 10 G. The controller 124 in this embodiment can utilize conventional processing technology similar to what was described for the IP router 112 to support the functions of the Ethernet switch 114 in accordance with the present disclosure.

It should be noted that the communications interface 122 of the IP routers 112 and Ethernet switches 114, respectively, also utilize conventional technology for hybrid interconnects between said systems thereby allowing the formation of the hybrid network shown in FIG. 1.

Figure 4:
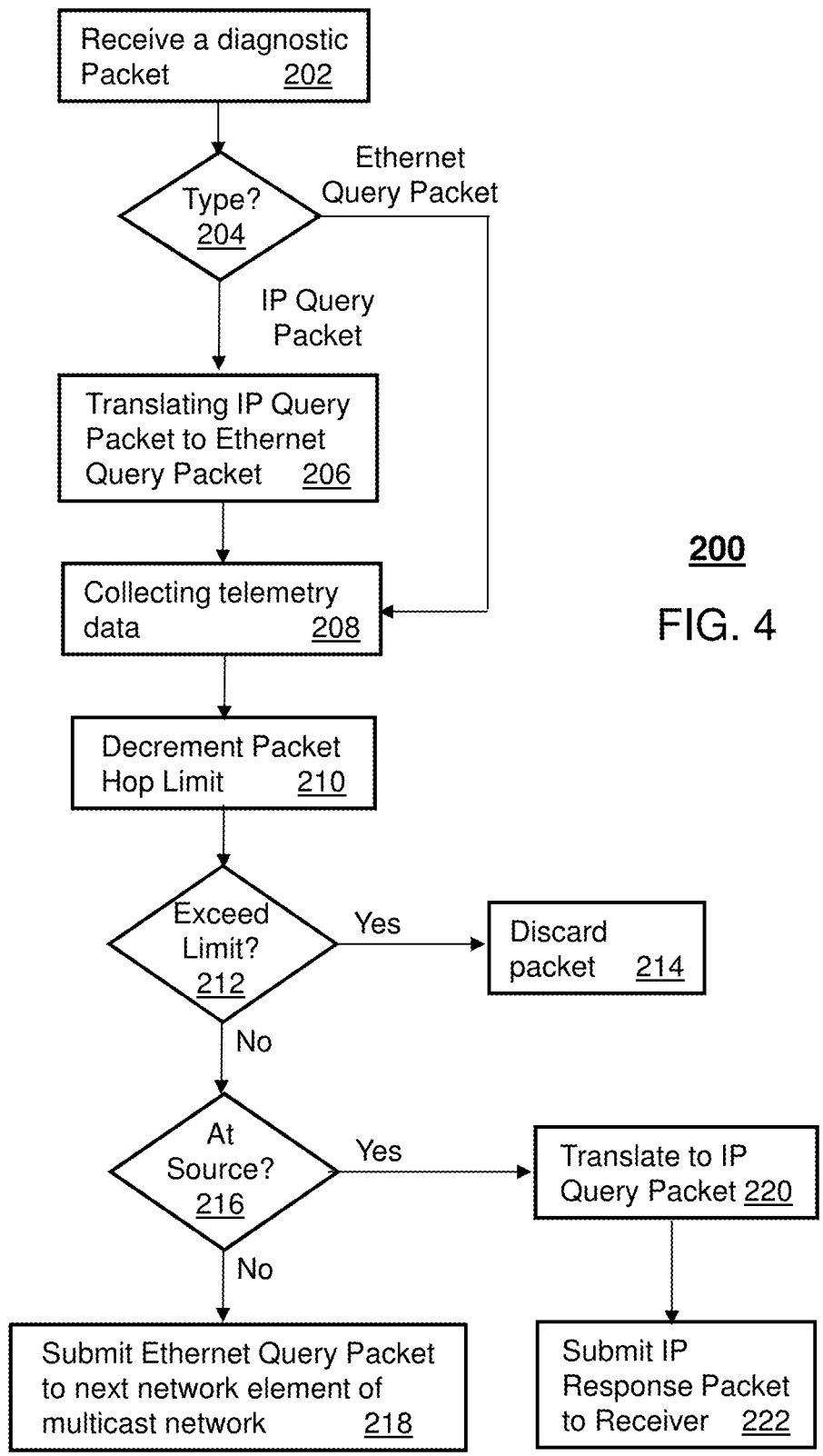
FIGS. 4-5 depict flowcharts of methods operating in the Ethernet switches and IP routers, respectively, according to an embodiment of the present disclosure.
Figure 5:
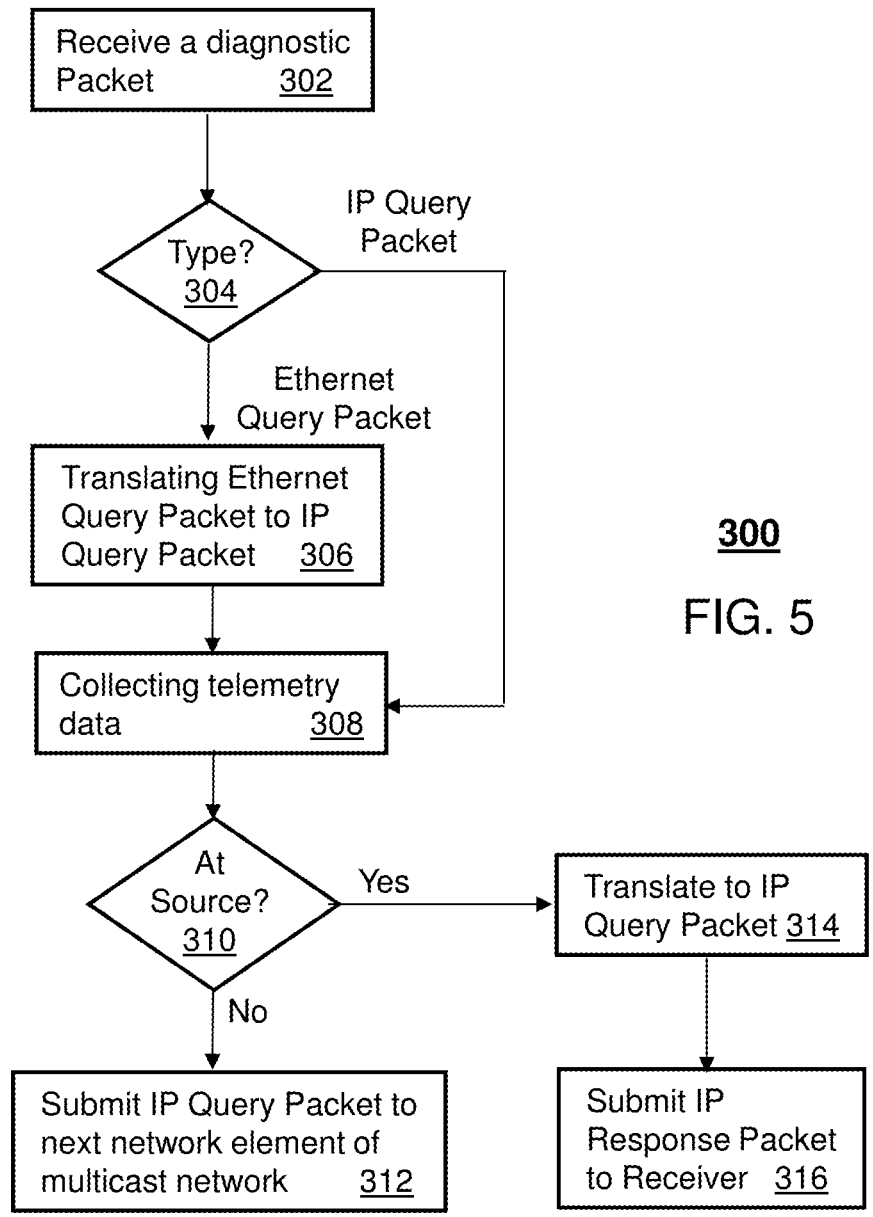

FIGS. 4-5 depict flowcharts of methods 200 and 300 operating in the Ethernet switches and IP routers, respectively, according to an embodiment of the present disclosure. Method 200 represents the flow of a diagnostic packet in a trace route 110 initiated by the receiver 104 of FIG. 1 under the control of, for example, a management system (not shown) of the service provider of the hybrid network connected to the receiver 104 by way of another communication link 105 of the service provider's network.

The trace route 110 traces each network element connecting the receiver 104 and the source 102 in a multicast network. Once the trace packet reaches the source 102, a unicast IP response packet returns back on a response route 111. The response route 111 can travel on the same network elements as did the trace route 110 or in a unicast path different from these elements. In either case, the IP response packet travels in the reverse direction towards the receiver 104. The IP response packet includes telemetry information collected from each network element connecting the source 102 and receiver 104. The receiver 104 can process or relay this telemetry information to the service provider who in turn determines where and why a communication interruption may have occurred.

Referring back to FIG. 4, method 200 begins with step 202 where the Ethernet switch 114 receives a diagnostic packet. The diagnostic packet can be an IP query packet (such as an mtrace packet) or an Ethernet query packet. In the illustration of FIG. 1, the first network element coupled to the receiver 104 is an Ethernet switch 114. In this illustration the Ethernet switch 114 receives an IP query packet from the receiver 104. It will be appreciated that the multicast network of FIG. 1 configuration is simply illustrative. That is, the receiver 104 could have in the alternative been coupled to an IP router 112, and the Ethernet switches 114 could have been located upstream in the multicast network. Thus, whether an IP query packet comes directly from the receiver 104 or and IP router 112, the Ethernet switch 114 is programmed to process either format.

In the present instance, however, it is assumed that the packet received and detected in steps 202 and 204 is an IP query packet, in which case the Ethernet switch 114 proceeds to step 206 where it translates the IP query packet to an Ethernet query packet. FIG. 3 is block diagram depicting a format of an Ethernet query packet according to an embodiment of the present disclosure. In this disclosure, the Ethernet query packet can include one or more of the following telemetry fields:

An arrival time of the Ethernet query packet at the switch 114;

An upstream network element address, which identifies the next network element (i.e., an IP router 112 or Ethernet switch 114) located adjacent to the switch in question, and upstream towards the source 102 of the multicast data;

A downstream network element address, which identifies the previous network element (i.e., an IP router 112 or Ethernet switch 114) located adjacent to the switch in question, and downstream towards the receiver 104;

A multicast channel number (or group number), which identifies the channel used between the source 102 and receiver 104 in the multicast network;

An input packet count at the arrival time, which identifies the number of packets received by the switch at the time the query packet arrives;

An output packet count at the arrival time, which identifies the number of packets transmitted by the switch at the time the query packet arrives;

A total packet count at the arrival time, which identifies the total number of packets processed by the switch at the time the query packet arrives;

A protocol operating at the receiving Ethernet switch (e.g., IGMP);

A packet hop limit, which sets a limit on how many network elements can be traversed by the query packet; and A diagnostic code, which provides a state of operation of the Ethernet switch 114.

The diagnostic code can in turn can include:

A no error code corresponding to a no-fault state in the receiving Ethernet switch 114;

A wrong interface code corresponding to an IP or Ethernet query packet received by the Ethernet switch from a network element not belonging to the multicast network;

A channel route error code corresponding to an IP or Ethernet query packet received from a network element on a multicast network channel different from that used by the receiver; and A router error code corresponding to receiving an IP query packet from an unexpected IP router.

The foregoing fields are illustrative of the telemetry fields and diagnostic codes that can be used in an Ethernet query packet for isolating and diagnosing faults in a hybrid network of IP routers 112 and Ethernet switches 114. It would be obvious to an artisan with skill in the art that other telemetry data not mentioned above that can prove useful for isolating faults in a hybrid network such as shown in FIG. 1 is within the scope and spirit of the claimed examples.

Referring back to FIG. 4, the Ethernet switch 114 populates the aforementioned telemetry fields in step 208. In step 210, the switch 114 decrements the packet hop limit. This field is initially established by the receiver 104 with a number that represents the number of allowable network element hops. This field can prove useful in limiting the number of hops a query packet undertakes in a multicast network. It is especially important in that it can be used to destroy query packets that get lost in the network for any apparent reason. As each Ethernet switch 114 receives an Ethernet query packet, this field is decremented in step 210. If it reaches zero, for instance, the Ethernet switch 114 can assume that the packet is lost, because the limit is set such that the number should never reach zero in a diagnostic session. Since query packets can consume significant processing resources of a switch, it is important that a means be available to destroy lost query packets as performed by steps 212 and 214.

If the hop limit is not exceeded, however, the Ethernet switch 114 proceeds to step 216 where it checks if it is coupled to the source 102. If not, the Ethernet switch 114 proceeds to step 218 where it submits the Ethernet query packet to the next network element. If the network element happens to be an Ethernet switch 114, such switch will process the query packet according to steps 208 through 222, thereby appending additional telemetry data such as described in FIG. 3. If, on the other hand, the Ethernet switch 114 is coupled to the source 102, then the multicast diagnostic trace has been completed, in which case the switch proceeds to step 220 where it translate the Ethernet query packet to an IP response packet and submits it in step 222 back to the receiver 102 through the response route 111 described earlier.

FIG. 5 depicts method 300 operating in the IP routers 112. In step 302, a diagnostic packet is received. If the packet is detected in step 304 as an Ethernet query packet, then the router 112 proceeds to step 306 where it translates the Ethernet query packet to a conventional IP query packet. In step 306, the IP query packet collects the telemetry data of the router much like in the case of a conventional Mtrace packet. If, on the other hand, the diagnostic packet received in step 302 is detected in step 304 as an IP query packet, then step 306 is bypassed and telemetry collection takes place in step 308. If the router 112 is coupled to the source 102, it translates the IP query packet to an IP response packet in step 314 and transmits said packet back to the receiver 104 on the response trace 111. Otherwise, the router 112 proceeds to step 312 where it submits the IP query packet to the next network element.

Methods 200 and 300 describe algorithms operating in the Ethernet switches 114 and IP routers 112 which allow any hybrid configuration of these network elements for conducting an end-to-end diagnostic trace. This disclosure can therefore provide a means for further visibility into the operations of a multicast network not presently available in prior art systems.

It should be evident by now that the present disclosure can be realized in hardware, software, or a combination of hardware and software. Moreover, the present disclosure can be realized in a centralized fashion, or in a distributed fashion where different elements are spread across several interconnected processors. Thus, any kind of computing device or other apparatus adapted for carrying out methods 200 and 300 described above is suitable for the present disclosure.

It should be also evident that the present disclosure may be used for many applications. Thus, although the description is made for particular arrangements and methods, the intent and concept of the disclosure is suitable and applicable to other arrangements and applications not described herein. It would be clear therefore to those skilled in the art that modifications to the disclosed embodiments described herein could be effected without departing from the spirit and scope of the disclosure.

In accordance with various embodiments, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

A software program in the present context means any expression, in any language, code or notation, of a set of instructions intended to cause a system having an information processing capability to perform a particular function either directly or after either or both of the following: a) conversion to another language, code or notation; b) reproduction in a different material form.

It should also be noted that the software implementations as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, other re-writable (volatile) memories. Accordingly, the disclosure is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art that are applicable to the present disclosure. Such standards are periodically superseded by faster or more efficient equivalents having essentially the same functions. Accordingly, replacement standards and protocols having the same functions are considered equivalents.

The described embodiments ought to be construed to be merely illustrative of some of the more prominent features and applications of the disclosure. It should also be understood that the claims are intended to cover the structures described herein as performing the recited function and not only structural equivalents. Therefore, equivalent structures that read on the description should also be construed to be inclusive of the scope of the disclosure as defined in the following claims. Thus, reference should be made to the following claims, rather than to the foregoing specification, as indicating the scope of the disclosure.

What is claimed is:

1. A device comprising:
    a processing system including a processor; and
    a memory that stores executable instructions that, when executed by the processing system, facilitate performance of operations comprising:
        receiving an internet protocol query packet generated by a receiver for collecting telemetry data on a route between a source and the receiver in a multicast network, wherein the route comprises one of a trace route and a response route, the trace route comprising a first set of network elements, the response route comprising a second set of network elements different from the first set of network elements;
        translating the internet protocol query packet to an Ethernet query packet, wherein the Ethernet query packet does not include a network address;
        collecting in the Ethernet query packet telemetry data from an Ethernet switch, and
        submitting the Ethernet query packet to a next network element of the multicast network.

2. The device of claim 1, wherein communications traffic over the multicast network comprises communications packets received and processed by the Ethernet switch, wherein the Ethernet query packet comprises a telemetry field, wherein the telemetry field includes an arrival time of the Ethernet query packet at the Ethernet switch, and wherein the telemetry data collected in the Ethernet query packet comprises an input packet count identifying a number of communications packets received by the Ethernet switch at the arrival time and a total packet count identifying a total number of communications packets processed by the Ethernet switch at the arrival time.

3. The device of claim 1, wherein the operations further comprise:
    monitoring for a hop limit being exceeded; and
    discarding the Ethernet query packet responsive to the hop limit being exceeded.

4. The device of claim 3, wherein the operations further comprise, in response to the receiver initializing the hop limit in the internet protocol query packet, decrementing the hop limit.

5. The device of claim 1, wherein the telemetry data collected in the Ethernet query packet comprises a multicast channel number and a protocol operating at the Ethernet switch.

6. The device of claim 1, wherein the operations further comprise collecting in the Ethernet query packet telemetry data from a root internet protocol router.

7. The device of claim 6, wherein the operations further comprise translating the Ethernet query packet into an internet protocol response packet.

8. The device of claim 6, wherein the Ethernet switch comprises an internet group management protocol snooping Ethernet switch.

9. The device of claim 1, wherein the Ethernet query packet includes a diagnostic code.

10. The device of claim 9, wherein the diagnostic code comprises a channel route error code.

11. A method comprising:
    receiving, by a processing system including a processor, an internet protocol query packet generated by a receiver for collecting telemetry data on a route between a source and the receiver in a network, wherein the route comprises one of a trace route and a response route, the trace route comprising a first set of network elements, the response route comprising a second set of network elements different from the first set of network elements;
    translating, by the processing system, the internet protocol query packet to an Ethernet query packet, wherein the Ethernet query packet does not include a network address;
    collecting, by the processing system, telemetry data in the Ethernet query packet from an Ethernet switch; and
    submitting, by the processing system, the Ethernet query packet to a next network element of the network.

12. The method of claim 11, wherein a telemetry field of the Ethernet switch includes an arrival time of the Ethernet query packet at the Ethernet switch.

13. The method of claim 12, wherein traffic over the network comprises the Ethernet query packet and data packets received and processed by the Ethernet switch, wherein the Ethernet query packet includes an input packet count identifying a number of the data packets received by the Ethernet switch at the arrival time, a total packet count identifying a total number of the data packets processed by the Ethernet switch at the arrival time, and a protocol operating at the Ethernet switch.

14. The method of claim 11, wherein the Ethernet switch is between the source and the receiver in a multicast network, and wherein the Ethernet query packet includes a multicast channel number.

15. The method of claim 11, wherein the Ethernet query packet is received by and translated by an internet protocol router into another internet protocol query packet.

16. The method of claim 11, wherein the Ethernet query packet includes a diagnostic code.

17. A non-transitory machine-readable storage medium, comprising executable instructions that, when executed by a processing system including a processor, facilitate performance of operations, comprising:
    receiving an internet protocol query packet generated by a receiver for collecting telemetry data on a route between a source and the receiver in a multicast network, wherein the route comprises one of a trace route and a response route, the trace route comprising a first set of network elements, the response route comprising a second set of network elements different from the first set of network elements;
    translating the internet protocol query packet to an Ethernet query packet, wherein the Ethernet query packet does not include a network address; and collecting in the Ethernet query packet telemetry data from an Ethernet switch, wherein the Ethernet switch is between the source and the receiver in the multicast network.

18. The non-transitory machine-readable storage medium of claim 17, wherein the operations further comprise submitting the Ethernet query packet to a next network element of the multicast network.

19. The non-transitory machine-readable storage medium of claim 17, wherein a telemetry field of the Ethernet switch includes an arrival time of the Ethernet query packet at the Ethernet switch.

20. The non-transitory machine-readable storage medium of claim 19, wherein traffic over the multicast network comprises the Ethernet query packet and data packets received and processed by the Ethernet switch, and wherein the telemetry data collected in the Ethernet query packet comprises an input packet count identifying a number of the data packets received by the Ethernet switch at the arrival time and a total packet count identifying a total number of the data packets processed by the Ethernet switch at the arrival time.

* * * * *